May 16, 1961  C. E. KLEIBER  2,984,542
CARBON LEVEL ANALYZER
Filed Jan. 30, 1957  2 Sheets-Sheet 2

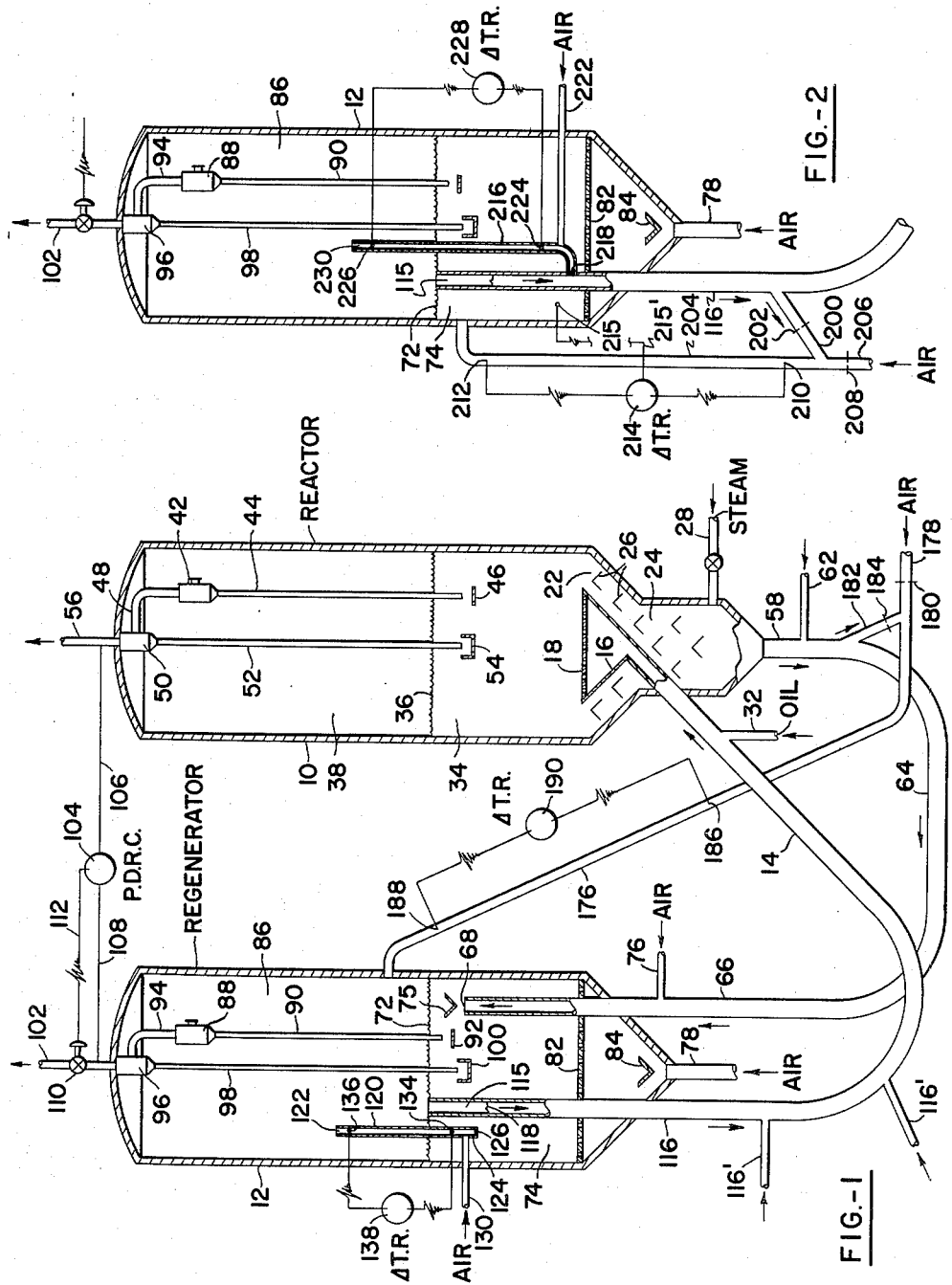

Carl E. Kleiber  Inventor

By *George J. Silhavy*  Attorney

United States Patent Office 2,984,542
Patented May 16, 1961

2,984,542
CARBON LEVEL ANALYZER

Carl E. Kleiber, Pleasant Hill, N.J., assignor to Esso Research and Engineering Company, a corporation of Delaware Filed Jan. 30, 1957, Ser. No. 637,231
14 Claims. (Cl. 23—1)

This invention relates to a method of and apparatus for determining the amount of carbon on finely-divided solids such as catalysts in fluid solids processes and more particularly relates to a method of and apparatus for determining continuously or at intervals the amount of carbon or coke on a hydrocarbon cracking catalyst in a fluid bed regenerator or in a catalyst transfer line leading to or from the regenerator.

An effective and simple continuous method for measuring the carbon level on regenerated catalyst in the catalytic cracking of hydrocarbons has been sought for many years. Many ways using different instruments have been suggested but none has proved entirely satisfactory. One method commonly used involves taking a catalyst sample from the regenerator system and running a combustion analysis on the sample, but such method is too time consuming to be greatly useful in plant operations because it is necessary to wait for the results. While waiting for such results there may be a build-up of carbon or coke on the catalyst and then afterburning in the dilute phase in the regenerator may occur with disastrous results to the regenerator cyclone separators and related equipment.

According to the present invention, a carbon-on-catalyst analyzer has been designed to fulfill this need and to provide catalytic cracking unit operators with an analyzer or instrument which indicates, within a relatively short time, any change in the amount of coke or carbon on the catalyst in, from or to the regenerator and in this way the operator can prevent carbon build-ups and cracking unit upsets and help operate his plant at maximum effectiveness and efficiency.

In its broad form, the analyzer is a substantially vertical tube through which a metered and/or regulated quantity of air and entrained carbon-containing catalyst flow. Burning takes place in the tube and as a result of carbon burning, there will be a temperature rise of the materials passing up through the tube. At a fixed rate of air introduction into the tube, this temperature rise will be a function of the carbon level or the amount of carbon on the regenerated catalyst particles.

The invention includes an equipment arrangement in a fluidized solids process of controlled flow and mixing of a portion of the fluidized solids with injection of gaseous components in substantially continuous flow with the mixed phase passing through a conduit. A reactant gas is injected or introduced near the inlet or lower end of the conduit and the resulting differential temperature along the conduit is used to correlate with and thus record and/or indicate the level of carbon or other contaminant on the flowing or fluidized solids for purposes of plant control and efficiency.

More specifically, the present invention provides a method and apparatus for passing a small and regulated quantity or amount of the total circulating cracking catalyst particles through a small conduit or tube, either internal or external of the plant vessels or lines, and using a controlled amount of reactant gas, such as air, to react with the carbon or coke deposit on the catalyst particles in the tube or conduit and by differential temperature measurement along the tube or conduit, to correlate the measurement with the level or amount of carbon or other contaminant on the catalyst particles. The conduit or tube is heat insulated to prevent any substantial amount of heat transfer between the tube or conduit and its contents and the dense fluidized bed of solids in the regenerator or the dilute phase above same when the tube is partly or completely submerged in the regenerator fluid bed and to prevent heat loss from the analyzer tube when it is exterior to the regenerator.

In one form of the invention the conduit or tube is immersed or submerged in a substantially vertical position, totally or partially in the dense fluidized catalyst bed in the regenerator near the regenerator standpipe inlet, the inlet of the conduit or tube being provided with a suitably sized restriction orifice to regulate the amount of catalyst particles entering the tube or conduit and introducing a controlled amount of fluidizing and reacting air near the catalyst inlet to the conduit or tube into the conduit or tube to further dilute the fluidized catalyst particles and transport them as in a relatively dilute phase riser upwardly and out of the top of the conduit or tube to a lower pressure zone, as for example, to the dilute phase above the dense fluidized bed of catalyst particles in the regenerator of a fluid solids catalytic conversion unit.

In another form of the invention the regenerated catalyst particles or spent carbon-containing catalyst particles are withdrawn from their respective standpipes through suitably arranged facilities including a tube or conduit and control and measuring means to control the rate of catalyst particles withdrawal, fluidization, injection or introduction of the controlled amount of air for combustion and lifting action through the conduit with differential temperature measurement along the tube or conduit and return of the conduit discharge to the regenerator vessel or other suitable place.

In the present invention the various flow rates of the solids and reactants involved are controlled in a positive and simple manner for accuracy of correlation in use in all fluidized solids processing steps for determining the condition or quality of the circulating finely-divided solids.

In the drawings:

Fig. 1 represents diagrammatically a catalytic cracking unit with one carbon analyzer included in the regenerator and another for use on spent carbon-containing catalyst leaving the reactor;

Fig. 2 represents a regenerator with carbon analyzers shown in two arrangements.

Figure 4:
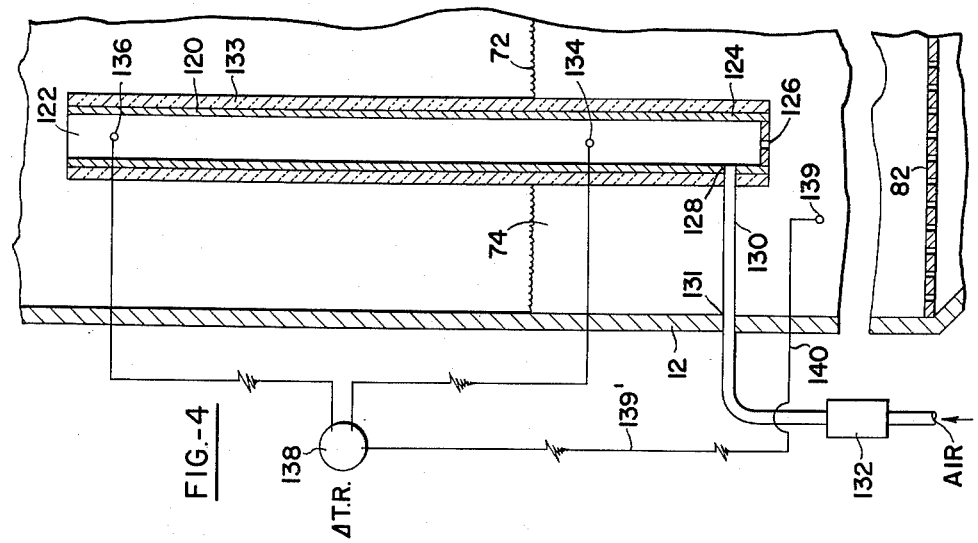
Figs. 3 and 4 show details of conduits and tubes to be used in a regenerator installation of the carbon analyzer where the catalyst drawoff from the regenerator is different from that in Figs. 1 and 2.

Referring now to the drawings and more particularly to Fig. 1, the invention will be described in connection with a catalytic cracking unit but the invention is not to be restricted thereto as the invention is useful with other hydrocarbon catalytic conversion processes and other processes where contaminants are removed from catalysts or solids by oxidation or the like. The reference character 10 designates a reactor and the reference character 12 designates a regenerator. The reactor 10 is a vertically arranged cylindrical vessel into which finely-divided catalyst and oil are passed through inlet line 14 and into inverted conical member 16 arranged in the bottom portion of the reactor 10.

Conical member 16 is provided at its outlet end with a horizontally arranged distribution grid 18 concentric with reactor 10 and spaced from the inner wall of the reactor 10 to provide annular passageway 22 whereby the catalyst particles may pass downwardly from reactor 10 to the stripping section 24 provided with baffles 26 to improve contact between the downflowing catalyst particles and the upflowing steam introduced into the lower portion of the stripping zone or section 24 through one or more lines 28. Oil feed is introduced into line 14 through line 32.

The oil feed introduced through line 32 may be any suitable hydrocarbon stock for producing gasoline, such as gas oil, naphtha, residual oils, etc. The oil feed is preferably preheated to a temperature between about 350° F. and 800° F., depending upon the degree of conversion of the feed and the coke yield which is laid down on the catalyst and burned off in the regenerator to thereby aid in supplying all or a considerable portion of the heat requirements of the process, before contacting the catalyst particles flowing through line 14 to the reactor 10. The catalyst is any suitable cracking catalyst such as silica-alumina, silica-magnesia, silica-alumina-magnesia, acid treated bentonitic clays, etc. The catalyst is finely divided and has a particle size between about 400 and 100 standard mesh or finer or between about 10 and 150 microns, with the major portion of the catalyst being between about 20 and 80 microns.

The temperature in the reactor 10 during cracking is usually between about 850° F. and 1050° F. and the temperature in the regenerator 12 is usually between about 1000° F. and 1200° F. The catalyst to oil weight ratio being fed to the reactor 10 through line 14 is between about 5 and 20 and the reactor space velocity, w./hr./w. (weight of oil per hour per weight of catalyst) is between about 0.5 and 60.

The superficial velocity of the hydrocarbon vapors and any added steam passing up through reactor 10 is between about 0.5 and 10 feet per second. The superficial velocity of the regenerating gases passing up through regenerator 12 is between about 0.5 and 5 feet per second. When using a transfer line reactor, the velocity of the solids suspension passing therethrough is between about 5 and 50 feet per second.

The vapors flowing up through the reactor 10 fluidize the catalyst particles to form a dense fluidized turbulent dry bed 34 having a level indicated at 36 and a dilute phase 38 thereabove. The dense fluidized bed when using the finely-divided catalyst comprising silica-alumina has a density between about 15 and 30 lbs. per cubic foot. The upflowing cracked vapors in the dilute phase 38 contain entrained catalyst which is separated by passing the vapors through a dust separator such as a cyclone separator 42 provided with a dipleg 44 for returning the separated catalyst particles to below the level 36 of the dense fluidized bed 34. A splash plate 46 or other seal device is preferably arranged below the outlet of dipleg 44.

The vapors leave cyclone separator 42 and pass through line 48 to a second stage separator such as a cyclone separator 50 provided with a dipleg 52 and a cup-shaped seal pot 54 or other seal device arranged below the outlet end of dipleg 52 and usually but not necessarily below the surface or level 36 of the dense bed 34 in reactor 10. The cracked vapors leave reactor 10 overhead through line 56 and are passed to suitable separation equipment (not shown) such as a fractionator for separating the cracked products into desired products.

During the cracking operation in reactor 10, there is deposited coke or carbonaceous material on the catalyst particles and it is necessary in order to operate the process continuously and economically, to regenerate them as by burning with air or other oxygen-containing gas to remove the carbon or carbonaceous deposit. The spent catalyst as a dense fluidized mixture flows down through stripping section 24 where entrapped volatile hydrocarbons are stripped from the catalyst and passed up into the reactor 10. From the stripping section the stripped catalyst flows into standpipe 58. The catalyst is maintained in a fluidized condition in the standpipe by the introduction of aerating gas such as steam introduced through one or more lines 62.

The fluidized catalyst mixture then flows through U-shaped line 64 of which standpipe 58 is a part and then up through riser portion 66 into regenerator 12. The outlet end 68 of riser 66 is arranged below the level 72 of the dense fluidized turbulent dry bed 74 of catalyst undergoing regeneration. An inverted conical baffle 75, V-shaped in cross section, is arranged above the outlet end 68 of riser 66 to spread out the catalyst and gas being introduced into the regenerator through riser 66. Regenerating gas such as compressed atmospheric air is introduced into the riser 66 through line 76 for controlling the rate of circulation of catalyst between the reactor and regenerator. Additional regenerating gas is introduced into the bottom of the regenerator 12 through line 78 below distribution grid member 82 arranged horizontally in the bottom portion of the regenerator 12. An inverted conical baffle 84 is arranged below grid 82 and above the outlet end of line 78.

Figure 3:
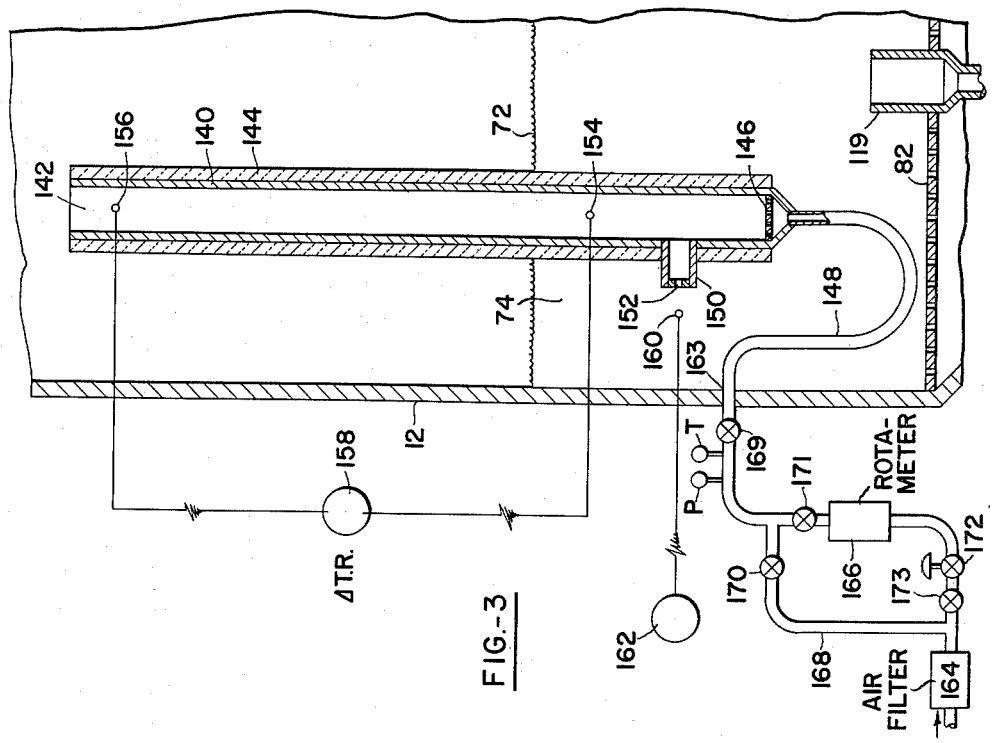

The apparatus shown in Figs. 1 and 2 is a particular type of cracking unit as shown in Packie U.S. Patent No. 2,589,124 granted March 11, 1952, but the present invention is not restricted to use with this particular apparatus which is being used as one example or type of cracking unit. The present invention is applicable to any fluidized solids process in which the quality of the circulating solids or catalyst, as regards contaminating carbon or hydrocarbons, between processing vessels may vary. For example, as shown in Fig. 3 a different type of catalyst withdrawal line is shown for the regenerator as will be hereinafter described in greater detail.

The superficial velocity of the upflowing regenerating gas in regenerator 12 is between about 0.5 and 5 feet per second and is so selected to form the dense fluidized turbulent bed 74 of solid finely-divided catalyst particles with a dilute phase 86 thereabove. One, two or more stages of separating devices similar to those described above in connection with the reactor 10 are provided in the upper portion of the regenerator 12 and comprise a first cyclone separator 88 having a dipleg 90 and splash plate 92 arranged below level 72 of the bed 74.

Line 94 leads from the first cyclone separator 88 to second cyclone separator 96 having a dipleg 98 extending below level 72 and provided with a sealing cup 100. Regeneration gases pass overhead through line 102. For the type of unit described in connection with Fig. 1, a selected differential pressure between about 0 and 5 p.s.i.g. is maintained between the top operating pressures of reactor 10 and regenerator 12 by a pressure differential recorder controller shown diagrammatically at 104 with lines 106 and 108 leading to the outlet lines 56 and 102 of the reactor and regenerator, respectively, and having a valve 110 in line 102 from the regenerator controlled by the controller 104 through line 112.

Regenerated catalyst overflows into well 115 which establishes level 72. Regenerated catalyst is withdrawn from the regenerator 12 through standpipe 116. Well 115 extends up into the regenerator 12 above grid 82 and above the level of the outlet end 68 of riser 66 to maintain the level of catalyst during regeneration substantially at the level 72. The level of the regenerated catalyst in standpipe 116 is shown at 118. The standpipe 116 and inlet line 14 form a U-shaped line for continuously transferring regenerated catalyst from regenerator 12 to reactor 10, and standpipe 58, line 64 and riser 66 form another U-shaped line for continuously returning spent catalyst particles from the reactor 10 to the regenerator 12.

This form of apparatus is substantially that shown in the above-mentioned Packie U.S. Patent No. 2,589,124 and no further detailed description is necessary. In this Packie patent no slide valves are used in the standpipes to control flow of catalyst in the unit. Instead of using the U-shaped transfer lines of the Packie patent, other cracking units using slide valves in the standpipes for control of catalyst between the reactor and regenerator may be used. The regenerated catalyst withdrawal line or standpipe is also different from that in the Packie patent and in one case, for example as shown in Fig. 3, the upper end of the standpipe 119 extends only a relatively short distance above the grid.

When the catalytic cracking unit is carefully supervised and controlled, the operation is entirely satisfactory as above described. However, under some circumstances, the catalytic cracking unit becomes upset for sundry reasons and then it is important to determine and regulate closely the efficiency of regeneration of the circulating catalyst. These upsets may occur in various ways and usually result in a build-up of coke or carbon and/or shorter cyclic build-ups and burn-offs of these materials on the catalyst particles and when this results, afterburning often starts in the dilute phase 86 and in some instances the cyclone separators 88 and 96 have been excessively heated and have been damaged or collapsed, necessitating shut-down of the unit and repair of the unit.

The amount of coke or carbon usually on the regenerated catalyst particles passing through line 14 to the reactor 10 is between about 0.2 and 0.7% by weight on the catalyst and this amount varies with different cracking units. However, when the amount of coke or carbon rises to about 1 to 2% by weight on the catalyst, and in extreme cases up to 10 to 15% by weight on the catalyst the cracking unit is not operating properly, regeneration is poor, conversion in the reactor is poor, with the desired product distribution suffering, and there is more and more carbon formed and the unit as a whole is being operated most uneconomically.

With the present invention, it is easily possible to at all times determine if regeneration of the catalyst particles is normal or to determine if there is an abnormal accumulation or loss of coke or carbon on the catalyst. In the preferred form, as shown in Fig. 1, a vertical tube 120 is arranged in the dense fluid catalyst bed 74 near the regenerator standpipe 116 inlet at a location to sample a representative portion of the flowing catalyst. Tube 120 has open upper end 122 above the level 72 of the dense catalyst bed 74, but the outlet upper end 122 may be submerged below the level 72 of the dense catalyst bed 74. Tube 120 is shown enlarged in Fig. 4; another form of tube is shown in Fig. 3.

The bottom end 124 of tube 120 has a restriction orifice 126 for control of the amount of catalyst entering tube 120 from bed 74. Above the bottom end, the tube 120 has a lateral opening 128 in the side wall thereof into which is secured an air line 130 for introducing a controlled amount of air into the bottom portion of the tube 120. The air line 130 extends through opening 131 in the side wall of regenerator 12. The opening 131 is sealed to prevent loss of gas and solids from regenerator 12. The air volume is controlled by a rotameter or the like 132 in line 130 exterior to the regenerator 12. The air passing through line 130 submerged in the regenerator dense fluid bed is preheated by the latter before being introduced into the bottom of tube 120.

Tube 120 is heat insulated as at 133 from the hot dense fluidized bed 74 of catalyst undergoing regeneration and likewise from any heat loss to possibly lower temperature surroundings in the dilute phase above the regenerator dense bed of fluidized solids. A thermocouple 134 is arranged in the lower portion of tube 120 above opening 128 and a second thermocouple 136 is arranged in the tube 120 near the outlet end 122 thereof. The thermocouples 134 and 136 are connected to a differential temperature indicator or recorder 138 but may, of course, be independently recorded if so found more convenient.

The tube 120 acts as a small burner and the air or oxygen-containing gas introduced through line 130 in known or regulated amount draws in or entrains a certain amount of catalyst particles from the dense bed 74 and as the catalyst particles contain coke or carbon, burning occurs and there is a temperature rise in the mixture as the catalyst passes up from the first thermocouple 134 to the second thermocouple 136 which is indicated or recorded on recorder 138 which may be a potentiometer. An additional thermocouple 139 may be arranged in dense bed 74 adjacent the bottom of tube 120 and connected to recorder 138 by line 140 so that, if desired, the temperature difference between bed thermocouple 139 and either top or bottom tube thermocouple 134 or 136 may be obtained or used in the carbon on catalyst determination. Additional thermocouples, one or more, intermediate to the analyzer tube ends, of course, could be utilized within the concept of this invention.

Different cracking units operate with different amounts of coke or carbon on catalyst in normal operation as well as varying quality and activity of the catalyst so that the carbon analyzer of the present invention will preferably require calibration for each unit. The more carbon there is on the catalyst particles, the greater will be the temperature difference between the analyzer top and dense fluidized bed 74 or between the top and bottom of the analyzer tube 120. However, as the regenerator bed temperature during normal operation is substantially constant, the temperature difference between the analyzer top and bottom thermocouples, or thermocouples arranged in different vertical positions, will be an indication of the amount of coke or carbon on the catalyst. Or the temperature difference between the dense fluidized bed 74 in the regenerator and any portion of the tube analyzer but preferably the top or the upper portion of the analyzer tube, may be used for measuring the temperature differential.

In Fig. 3 there is shown a modification of the analyzer tube and its related parts. Tube 140 is vertically arranged with its upper end 142 opening above the level 72 of the dense bed 74 of catalyst in the regenerator. Tube 140 is provided with insulation 144. The bottom portion of tube 140 has a distribution grid member 146 and an air line 148 below the grid member. Tube 140 has a lateral hollow arm or extension 150 provided with a restriction orifice 152 at its outer end for introducing a controlled amount of catalyst into the lower portion of tube 140. However, a simple restriction orifice in the side of tube member 140 will suffice, too.

Lower thermocouple 154 is arranged in tube 140 above lateral extension 150 and upper thermocouple 156 is arranged in the tube 140 near its upper outlet end 142. Thermocouples 154 and 156 are connected to a temperature differential recorder or indicator 158 located outside of the regenerator 12 and which may be a potentiometer or other temperature indicating or recording device. A third thermocouple 160 is shown submerged in the dense fluidized bed 74 of the regenerator 12 and this thermocouple is connected with a recorder or indicator 162 outside of the regenerator 12 for indicating the temperature of the fluidized bed of catalyst particles in the regenerator 12. Or the thermocouple 160 may also be connected to recorder or indicator 158.

Air line 148 extends out of the regenerator 12 through opening 163 in the wall of regenerator 12 and is in sealed relation therewith to prevent loss of gas and solid from the regenerator. From opening 163 to the bottom of tube 140 the air line dips down as a U-tube. Air line 148, on the exterior of the regenerator, is provided with an air filter 164, a rotameter 166, and a by-pass line 168 around the rotameter.

Line 148 has a valve 169, by-pass line 168 has valve 170 and outlet line from rotameter 166 has valve 171 and inlet line to rotameter has valve 173. These valves permit shutting off the rotameter line in case of need to repair or replace the rotameter because of defective operation. Valve 172 also in the inlet line to rotameter 166, is a control valve, such as a needle valve, to adjust the gas flow rate to the analyzer. The elements "P" and "T" are pressure and temperature indicators.

Returning now to Fig. 1 there is shown an alternate form of analyzer tube 176 which is shown as extending from near the lower part of spent catalyst standpipe 58 to the dilute phase 86 in regenerator 12 but which may have its outlet and emptying into the dense bed 74 in the regenerator 12, if desired. The analyzer tube 176 is arranged exteriorly of the vessels and is insulated (not shown). The analyzer tube 176 has an air inlet 178 provided with a restricted orifice 180 near the inlet line. A small tube 182 having a restricted orifice 184 extends downwardly at an angle from standpipe 58 with which it communicates and conducts fluidized spent catalyst from the spent catalyst standpipe 58 to the analyzer tube 176. Instead of the restricted orifice to regulate the flow of gas to the analyzer tube, a control valve and rotameter arrangement as described previously in connection with Fig. 3 may be used.

With a fixed amount of air being introduced through line 178 and orifice 180, a certain fixed amount of catalyst will be picked up or entrained from small tube 182 and burned in tube 176 as the catalyst and air pass upwardly therethrough. A lower thermocouple 186 and a higher thermocouple 188 are provided in tube 176 to indicate the difference in temperature at these two points. The thermocouples 186 and 188 are connected to a differential temperature recorder 190 for indicating this difference in temperature. The thermocouples may be arranged at different relative positions than those shown in the drawing.

Referring now to Fig. 2, regenerated catalyst is withdrawn from a lower part of the standpipe 116, mixed with an oxygen-containing gas and passed up through an external analyzer tube which empties into the regenerator either into the dense fluidized bed or into the dilute phase. Or catalyst can be removed from the upper portion of the standpipe and passed through an internal analyzer tube in the regenerator.

Still referring to Fig. 2, a small tube 200 extends down at an angle from regenerated catalyst standpipe 116 and has a restriction orifice 202 therein. Tube 200 conducts regenerated catalyst particles from the lower portion of standpipe 116 into one end of a vertically arranged analyzer tube 204 which is insulated (not shown) and which is arranged outside of the regenerator 12. Tube 204 has an inlet 206 for air or other oxygen-containing gas and the inlet has a restriction orifice 208 for controlling the amount of air introduced into the tube 204. As shown in Fig. 2, the upper outlet end of tube 204 empties into the dense fluidized bed 74 in the regenerator 12. Lower thermocouple 210 and upper thermocouple 212 are provided for tube 204 for measuring the temperature rise in the catalyst mixture passing up in the tube 204. A differential temperature recorder 214 is arranged for indicating the temperature difference of the two thermocouples. Here again, a third thermocouple 215 may be submerged in regenerator bed 74 and connected by line 215' to recorder 214 for possible use in the analyzer operation. If desired, a thermocouple may be arranged in standpipe 116 just above line or tube 200 and connected with temperature recorder 214.

In another form shown in Fig. 2, a substantially vertical analyzer tube 216 is nearly completely submerged in the dense bed 74 above grid 82. The lower inlet end of tube 216 communicates with standpipe 116 above grid 82 or any convenient or suitable portion thereof for withdrawing regenerated catalyst particles therefrom. The lower inlet end of tube 216 has a restriction orifice 218 for controlling the amount of catalyst introduced into tube 216 from the standpipe. Air or oxygen-containing gas at a controlled rate is introduced into the lower portion of tube 216 through line 222. Tube 216 is insulated. Lower and upper thermocouples 224 and 226 are provided for the tube 216 and a differential temperature recorder or indicator is provided at 228. The upper open end 230 of the analyzer tube 216 extends above the upper end of withdrawal well 115 of standpipe 116 and so discharges or empties into the dilute phase 86 in the regenerator 12.

The analyzer of the present invention is adapted for continuous use to indicate any important changes in the amount of coke on the catalyst before, after or during regeneration but, if desired, the analyzer may be used intermittently. While air is the preferred oxidizing gas, other oxygen-containing gases and even substantially pure oxygen may be used, if desired.

The tube analyzer of the present invention is a vertically arranged tube through which are passed a metered quantity of air and entrained catalyst. The catalyst after normal regeneration still contains coke or carbon and this is burned in the insulated analyzer tube to give a temperature rise as the mixture passes up through the tube and this temperature rise will be a function of the carbon level on the regenerated catalyst at a given air rate. When a catalytic cracking unit is operating normally, there will be a certain amount of coke or carbon on the catalyst particles, and using the analyzer of this invention, a certain differential temperature will be indicated or recorded on the differential temperature recorder or indicator by the spaced thermocouples associated with the analyzer tube or between the upper thermocouple in the tube and the bed thermocouple.

If there is an upset, sometimes even of minor nature as following a change in quality of the oil feed, in the catalytic cracking unit and carbon is not removed correspondingly and efficiently in the regenerator, more or less carbon or coke will accumulate on the catalyst particles and with the analyzer in operation there will immediately be indicated a higher or lower differential temperature on the differential temperature recorder or indicator and the operator knows immediately that the catalytic cracking unit is not operating normally and to prevent a carbon build-up or oxygen break-through and possible after-burning in the dilute phase in the regenerator or in the cyclone separators associated with the regenerator, the operator is notified that he must take steps to prevent further upset to the unit and ulimate more serious consequences.

To avoid carbon build-up, the operator can: decrease reactor temperature, inject steam at the feed inlet, reduce catalyst reactor holdup or lower feed preheat, increase regenerator air rate or by other effective means known to those versed in the art, the precise method used depending on the type of catalytic cracking unit and if the plant is on automatic reactor temperature control or not. Similar steps but directionally opposite are used if there is a carbon burn-off from the catalyst.

The amount of burnable carbon on the catalyst is measured by the analyzer of the present invention. In the preferred form of the invention, a definite quantity of catalyst particles from the dense bed in the regenerator is continuously admitted to the bottom portion of the analyzer tube and this quantity of catalyst is regulated by controlling entrainment with a measured amount of air introduced into the bottom of the analyzer tube. The height of the fluid bed above the inlet to the analyzer tube is also a factor. As a result of carbon burning in the tube, the temperature of the catalyst particles in the analyzer tube rises above that of the dense bed in the regenerator which under normal conditions remains substantially constant. At a constant air rate, the temperature rise is a function of the carbon level on the catalyst particles.

For maximum sensitivity of the analyzer, a maximum of coke or carbon should be burned with a minimum of catalyst particles entering and passing through the analyzer tube. Moderate velocities are the best, giving greater burning time for a given tube size and length, but the velocity must be great enough to continually move the catalyst particles upwardly and out of the top of the analyzer tube. At sufficiently low velocities, the analyzer tube would function as an elutriator and would tend to fill up with larger catalyst particles and this is not the desired operation of the present analyzer tube. If this should occur, by chance or otherwise, a greater than normal air rate, using the rotameter bypass line if necessary, will clear the analyzer of any undesired settled material, catalyst or foreign material if the latter might have entered. The bypass line, of course, is desirable also should the rotameter become defective for any reason and require replacement.

The superficial velocity may be between about 0.5 and 10 feet per second, depending on the particle size, density, analyzer tube diameter, etc. The velocity and thus the actuating gaseous rate selected will also be dependent on the carbon level on the catalyst particles and the temperature of the catalyst particles entering the analyzer tube. However, in order to obtain a preferred analyzer design and operation with respect to sensitivity and reliability of operation, there is also a desired range in relationship between the gas rate through the analyzer and the quantity of fluidized solids or catalyst entering and passing through the analyzer as determined by the solids restriction orifice entrance, the depth of immersion of the latter in the fluidized solids vessel bed and the length of the analyzer tube as affected by the pressure drop through same, etc.

At low gas velocities through the analyzer tube, there may be a temperature loss from the bottom to the top of the analyzer tube because of lower than desirable burning rate. At high gas velocities through the analyzer tube, there may be only a small temperature difference between the bottom of the analyzer tube and the top or no temperature difference because of insufficient residence time of the catalyst in the analyzer tube. For the silica-alumina catalyst as above described, the preferred superficial air velocity through the analyzer tube is between about 2.5 and 5.0 feet per second to obtain best results with the analyzer tube of the present invention when the tube has an internal diameter between about 1 inch and 5 inches.

For a regenerator of about 5 to 60 feet in diameter and with a dense fluidized bed of catalyst in the regenerator between about 3 and 30 feet deep, the analyzer tube located inside the regenerator may be between about ½ and 3 inches in diameter and between about 5 and 20 feet long when the analyzer tube is entirely inside the regenerator. The preferred analyzer gas velocity will tend to be directly related to the analyzer tube diameter. When the analyzer tube is arranged exteriorly of the regenerator, its length may be about the same as the interiorly placed analyzer tube except that in some of the arrangements, the analyzer tube will be much longer due to the spacing of the regenerator and reactor but the spacing of the thermocouples is arranged to span only a desired portion of the analyzer tube as shown for elongated tube 176, for example, in Fig. 1. The distance between the thermocouples for internal analyzer tubes may be varied between about 3 feet and 18 feet for the tube range above given. For external analyzer tubes, the distance between the thermocouples may be greater and be as high as 25 feet in some cases. Because of the exterior location of the analyzer tube, the connecting inlet and outlet lines will tend to make the instrument longer and more costly than if located internally of the regenerator.

In the type of regenerator shown in Fig. 1, the analyzer tube 120 is located between standpipe 116 and the regenerator wall and the bottom of the tube should be about 2 to 5 feet below the top of overflow well 115. Or the analyzer tube may be located between the catalyst overflow well 115 and catalyst inlet line 68 in Fig. 1. The restriction orifice on the analyzer tube should be so located as to obtain a truly representative sample of the large mass of circulating catalyst.

In order to reduce the cost of construction of the analyzer, it will naturally be best to utilize the analyzer in the small size range. However, as the size is reduced to extremes, sensitivity and accuracy are more difficult of attainment because of the desire for as adiabatic construction as possible for the analyzer. If air is employed, the amount of dry and filtered air introduced into the bottom portion of the analyzer tube is between about 1 and 10 s.c.f.m. (standard cubic feet per minute) for the larger range of analyzer tube of the size range above described and proportionally lower as the size is reduced.

Data were obtained by using an analyzer tube of 3" schedule 40 pipe of 20 feet length of KA2S alloy material similar to the arrangement shown in Fig. 3 of the drawings. The orifice 152 was ½ inch in diameter. The insulation 144 contained in an 8-inch schedule 40 diameter pipe was an annulus of Johns-Manville Sil-O-Cel natural powder insulation. The orifice 152 was about 3 feet, 6 inches above the grid 82 and with about 300 tons catalyst holdup, the catalyst level 72 was about 5 feet above orifice 152. The height of the overflow well of standpipe 119 in Fig. 3 above grid 82 was about 2 feet and 6 inches and the bottom inlet orifice end of analyzer tube 140 was adjusted to be about 1 foot above the top of the overflow well of standpipe 119. This location of the solids inlet orifice will vary, of course, for each type of design of unit. Thus the installation as shown in Fig. 3 is useful for a cracking unit with a catalyst withdrawal line leading from the bottom of the dense bed of catalyst 74 while for the type shown in Figs. 1 and 2 with a top withdrawal of catalyst from the regenerator, the analyzer tube as shown in Fig. 1 may be arranged at a higher level because the level of catalyst in this type of cracking unit in the regenerator is substantially constant. In the type of unit shown in Fig. 3, the spent catalyst inlet is below the grid in the regenerator. In any event, the analyzer tube is so arranged or located to obtain the necessary differential pressure driving force to permit entry of the catalyst into the analyzer tube.

The above analyzer tube as shown in Fig. 3 was arranged in a fluid regenerator having a diameter about 55 feet and a fluid bed height of about 8½ feet. However, the analyzer tube 140 shown in Fig. 3 as located between the vessel wall 12 and the standpipe 119, was arranged more central of the regenerator vessel than the standpipe 119 in order to obtain a truly representative sample of the flowing catalyst. In other words the standpipe 119 was arranged between the analyzer tube 140 and the vessel wall 12. The top thermocouple 156 was arranged about 1 foot down from the top of analyzer tube 140 and the bottom thermocouple 154 was arranged about 2 feet above grid 146. The bed thermocouple 160 was arranged about 6 inches to the left of orifice 152 as shown in Fig. 3. As above pointed out, the temperature rise in the analyzer tube will be a function of the carbon or coke level on the regenerated catalyst, the temperature during regeneration in the regenerator, the rate of catalyst feed to the analyzer tube and the rate of air feed to the analyzer tube. The catalyst holdup in the regenerator was between about 280 and 312 tons during these runs. The catalyst was conventional silica alumina having an average size range as follows:

| | Percent by weight |
|---|---|
| 0–40 microns | 20 to 25 |
| 40–86 microns | 60 to 65 |
| 86–110 microns | 16 to 8 |
| 110 plus microns | 4 to 2 |

The data obtained is condensed in Table 1 as follows:

TABLE 1

*Analyzer operation at about 4 f.p.s. superficial gas velocity through analyzer*

| Test | Carbon on Regen. Cat., Wt. Percent [1] | $\Delta T$—° F. Regen. Bed to Anal. Top | Regen. Holdup, Tons | Cat. Inlet Orifice Immersion, Ft. | Regen. Bed Temp., ° F. |
|---|---|---|---|---|---|
| 1 | 0.26 | 44 | 296 | 4.4 | 1,114 |
| 2 | 0.28 | 42 | 290 | 4.3 | 1,107 |
| 3 | 0.28 | 43 | 280 | 4.0 | 1,098 |
| 4 | 0.28 | 42 | 285 | 4.1 | 1,110 |
| 5 | 0.30 | 40 | 285 | 4.1 | 1,111 |
| 6 | 0.33 | 39 | 296 | 4.4 | 1,114 |
| 7 | 0.34 | 50 | 312 | 4.8 | 1,101 |
| 8 | 0.34 | 44 | 302 | 4.6 | 1,100 |
| 9 | 0.37 | 54 | 290 | 4.3 | 1,102 |
| 10 | 0.40 | 54 | 296 | 4.4 | 1,102 |
| 11 | 0.41 | 55 | 290 | 4.3 | 1,101 |

[1] Based on samples taken from the regenerated catalyst standpipe and separately analyzed.

More detailed data of these runs are given in Table 2 as follows:

TABLE 2

*Data summary—carbon on catalyst analyzer*

| Test | 1 | 2 | 3 | 4 | 5 | 6 | 7 | 8 | 9 | 10 | 11 |
|---|---|---|---|---|---|---|---|---|---|---|---|
| Regen. Press., p.s.i.g | 7.8 | 7.7 | 7.7 | 7.9 | 7.8 | 7.8 | 7.8 | 7.8 | 7.7 | 7.8 | 7.9 |
| Regen. Holdup, Tons | 296 | 290 | 280 | 285 | 285 | 296 | 296 | 312 | 302 | 290 | 296 | 290 |
| Carbon on Regen. Cat., Wt. Percent | 0.26 | 0.28 | 0.28 | 0.28 | 0.30 | 0.33 | 0.34 | 0.34 | 0.37 | 0.40 | 0.41 |
| Carbon on Spent Cat., Wt. Percent | 1.10 | 0.88 | 0.88 | 1.06 | | 1.05 | 1.36 | 0.95 | | 1.09 | 1.33 |
| Air Rate, s.c.f.m.[1] | 5.50 | 6.30 | 5.53 | 5.48 | 6.34 | 5.50 | 5.54 | 5.54 | 5.76 | 5.45 | 5.49 |
| Regen. Bed Temp., ° F. (a) | 1,114 | 1,107 | 1,098 | 1,110 | 1,111 | 1,114 | 1,101 | 1,100 | 1,102 | 1,102 | 1,101 |
| Anal. Bottom Temp., ° F. (b) | 1,151 | 1,137 | 1,129 | 1,148 | 1,132 | 1,148 | 1,142 | 1,137 | 1,137 | 1,149 | 1,149 |
| Anal. Top Temp., ° F. (c) | 1,158 | 1,149 | 1,141 | 1,152 | 1,151 | 1,153 | 1,151 | 1,144 | 1,156 | 1,156 | 1,156 |
| Difference, c–a, ° F | 44 | 42 | 43 | 42 | 40 | 39 | 50 | 44 | 54 | 54 | 55 |

[1] For the analyzer tested the actual gas velocity in ft./sec. through the instrument tube is approximately numerically equal to the air rate in s.c.f.m. (std. cu. ft./min.) multiplied by ⅔.

From these data it will be seen that there is a correlation between coke on catalyst and temperature rise when using the present analyzer invention and it is possible to calibrate the instrument from these data. Each catalytic cracking unit is different and each analyzer tube will function generally the same but calibration will be desirable and necessary for adaptation to each cracking unit for best performance. For a given air rate or superficial velocity and with finely divided catalyst of the above described size ranges and with regenerator bed temperatures and bed heights substantially constant, a certain definite amount of catalyst will be drawn into the analyzer tube with a definite amount of introduced air and the temperature difference between the dense fluidized bed in the regenerator and the top thermocouple in the analyzer tube will vary with the amount of carbon or coke on the catalyst. The density of the mixture passing up through the analyzer tube using catalyst of the size and type above described and with a superficial velocity between about 2.5 and 5.0 feet per second will be between about 5 and 0.5 lb. per cu. ft.

Use of the analyzer instrument of the present invention gives information about the trends in the catalyst quality of the cracking unit, the carbon burning rate, carbon-conversion relationship, heat balance, and general stability of the processing equipment. These fluid solids processing facilities are often self-contained heat balanced units in that the necessary fuel for functioning is derived all or in a large part from the carbon deposited on the catalyst in the reactor and the deposited carbon is burned in the regenerator and, since a variation in carbon level on the regenerated catalyst influences the oil feed conversion level, any deviation from the average carbon level on the catalyst will tend to upset the unit stability. If this carbon buildup continues, an emergency condition may occur, resulting possibly in severe extremes of high and low regenerator temperature conditions in cyclic action as the carbon on the catalyst is alternately built up and then burned off excessively because of the unbalanced conditions of temperature and flow as the operators attempt to regain heat control of the plant. This may result in afterburning, i.e. greater than normal $CO_2:CO$ ratio in the flue gas because of the presence of excess $O_2$ when the catalyst is at low carbon level, possible equipment damage, loss in unit capacity, and possible emergency shutdown of the plant.

Referring again to the data in Table 1 it will be seen that with a superficial velocity of about 4 feet per second, smaller temperature differences between the regenerator bed and the top thermocouple in the analyzer tube are obtained when the amount of coke or carbon on catalyst is small. It should be appreciated that the range of carbon on catalyst level given by these data is in a rather narrow range during a period when the fluid catalytic cracking plant was operating smoothly. Naturally no deliberate unnecessary upsets in order to build up the carbon level for the analyzer testing would be tolerated by the plant operators. However, during one period of minor carbon buildup to 0.59% weight on catalyst a differential temperature of 110° F. was recorded by the analyzer. These data will clearly indicate the extremely good sensitivity of this analyzer invention herein described.

From the above data it will be seen that the differential temperature read on indicator 158 or the differential temperature between thermocouples 156 and 160 will give an indication to the operator of the condition of the catalytic cracking unit. Where the unit is operating satisfactorily or normally, the temperature differential between the regeneration bed and the top thermocouple in the analyzer tube will remain substantially constant for a given unit and in the particular unit on which the data were obtained will vary between about 30° F. and 60° F. However, if there is a carbon buildup on the catalyst for any reason, the temperature difference will increase to about 80° F. or higher to about 150° F. indicating that the cracking unit is departing from its normal balanced operation and is proceeding toward plant upset.

Also, a decrease in differential temperature reading by the analyzer will indicate a general lowering of carbon level on the catalyst which could indicate a lowering of cracking severity of the oil feed, the introduction of a more refractory feed of lower carbon yield or improved regenerator efficiency. This may require a reduction in main air supply to the regenerator to avoid possible afterburning in the dilute phase or in the gas-solids separating facilities. Hence, it will be seen that the analyzer tube of the present invention is useful for indicating any deviation from the normal carbon level on the catalyst to enable improved operation of the unit.

Increasing regenerator catalyst bed temperatures will tend to increase the analyzer differential temperatures because of higher reaction rates. This factor will best be determined for each analyzer installation and of course the carbon level on the catalyst being sampled.

While the catalyst has heretofore been specifically described as being mostly between about 20 and 80 microns in size, the present invention is also useful with coarser catalyst which contains particles predominantly greater than 80 microns in size. The invention is not restricted in use to finely divided catalyst or contact particles but may be used with larger sized materials. In a broader application the present invention is adapted for use for purifying materials for removal of contaminants.

While specific examples and data have been given for one analyzer tube, it is to be expressly understood that this is by way of illustration only and the invention is not to be limited thereto.

What is claimed is:

1. A process for indicating the extent of regeneration of finely divided cracking catalyst maintained as a dense fluidized bed in a regeneration zone which comprises introducing a controlled amount of air into the lower portion of a vertically arranged narrow confined passageway at least partially submerged in said dense fluidized bed, entraining a definite amount of catalyst particles from said dense bed by the passage of air through said confined passageway and measuring any difference in temperature in the upper portion of said passageway and the dense fluidized bed in said regeneration zone.

2. In a process wherein finely divided catalyst is circulated between a reaction zone and a regeneration zone and the catalyst particles contain burnable carbon or coke, the improvement of indicating actual operation of a processing unit which comprises passing a controlled amount of air through a confined passageway, introducing a regulated amount of catalyst particles containing carbon from one part of said unit, burning carbon during passage of the mixture of catalyst and air through said confined passageway, measuring the difference in temperature existing in said passageway and discharging the mixture from said passageway.

3. A process according to claim 2 wherein the catalyst particles introduced into said confined passageway are regenerated catalyst particles and the mixture discharged from said confined passageway is returned to said regeneration zone.

4. In a process wherein finely divided catalyst is circulated between a reaction zone and a regeneration zone and the catalyst particles in said regeneration zone contain burnable carbon, the improvement of continuously indicating the extent of regeneration of the catalyst particles in said regeneration zone, which comprises introducing a controlled amount of air into the bottom portion of a substantially vertically arranged confined passageway in said regeneration zone for upward passage therethrough, continuously introducing a regulated amount of catalyst particles containing burnable carbon from said regeneration zone into the bottom portion of said confined passageway for upward passage therethrough, burning carbon from said catalyst particles during upward passage of the mixture of catalyst particles and air through said confined passageway, measuring the temperature increase in said passageway and discharging the mixture of catalyst and air from the upper end of said confined passageway into said regeneration zone whereby the catalyst particles are returned to the process.

5. In an apparatus including a reactor and a burning vessel and transfer lines connecting said reactor and burning vessel for circulating finely divided solids therebetween, the improvement which includes a separate substantially vertically arranged tube having an open unrestricted upper end, means whereby a controlled amount of solid particles containing fouling deposits is withdrawn from one portion of the finely divided solids in said apparatus and is introduced into the lower portion of said tube for upward passage therethrough, means whereby a controlled amount of reactant gas is introduced into the bottom portion of said tube for upward passage therethrough and for reacting with said fouling material on said finely divided solids, said solids-gas mixture being discharged from said unrestricted upper end of said tube and returned to the circulating solids and means for continuously indicating the temperature difference between the upper portion and the lower portion of said tube to give an indication of the quality of the circulating solids.

6. An apparatus according to claim 5 wherein the solids are cracking catalyst solids, the burning vessel is a regenerator, the fouling deposits are carbonaceous deposits and said tube is exteriorly arranged with respect to said regenerator.

7. An apparatus for treating finely divided solids including a vessel adapted to contain a dense fluidized bed of finely divided solids, means for introducing finely divided solids into said vessel, means for withdrawing finely divided solids from said vessel, said vessel being provided with a distribution grid in its lower portion, a vertically arranged heat insulated tube having a restriction orifice in its bottom portion and an open unrestricted upper end, means whereby a controlled amount of reactant gas is introduced into the bottom portion of said tube and whereby solid particles are introduced into said tube through said restriction orifice and from said fluidized bed in said vessel, said tube being substantially vertically arranged in said vessel and having its lower end arranged above said grid, thermocouple means for measuring the temperature difference between the dense fluidized bed in said vessel and the upper portion of said tube, and indicating means outside said vessel for indicating said temperature difference.

8. An apparatus for treating finely divided solids including a vessel adapted to contain a dense fluidized bed of finely divided solids, means for introducing finely divided solids into said vessel, means for withdrawing finely divided solids from said vessel, said vessel being provided with a distribution grid in its lower porton, a vertically arranged heat insulated tube having a restriction orifice in its bottom portion and an open unrestricted upper end, means whereby a controlled amount of reactant gas is introduced into the bottom portion of said tube and whereby solid particles are introduced into the bottom portion of said tube through said restriction orifice and from said fluidized bed in said vessel, said tube being substantially vertically arranged in said vessel and having its lower end arranged above said grid, thermocouple means for measuring the temperature difference between the top portion and bottom portion of said tube and indicating means outside said vessel for indicating said temperature difference.

9. An apparatus of the character described including a tube having an unrestricted open upper end and being adapted to be arranged substantially vertically in a catalyst regenerator wherein finely divided catalyst is maintained as a dense fluidized bed during regeneration, said tube being of substantially uniform diameter for its entire length, said tube being provided with heat insulation material and having a restriction orifice near its lower end, means adjacent said restriction orifice whereby a controlled amount of reactant gas is introduced into said tube for upward flow therethrough and a certain amount of catalyst particles is drawn into the bottom portion of said tube from the dense fluidized bed in the regenerator through said restriction orifice, said means being adjacent said restriction orifice, and temperature responsive means connected with said tube at spaced points to indicate the temperature difference between the upper portion and the lower portion of said tube.

10. An apparatus of the character described including a tube having an unrestricted open upper end and being adapted to be arranged substantially vertically in a catalyst regenerator wherein finely divided catalyst is maintained as a dense fluidized bed during regeneration, said tube being of substantially uniform diameter for its entire length, said tube being provided with heat insulation material and having a restriction orifice near its lower end, means adjacent said restriction orifice whereby a controlled amount of reactant gas and a definite amount of catalyst solids from the fluidized bed are introduced into the lower portion of said tube for upward flow therethrough and temperature responsive means connected with said tube at spaced points to indicate the temperature difference between the upper portion and the lower portion of said tube, the upper open end of said tube being adapted to discharge the catalyst gas mixture into the regenerator.

11. An apparatus of the character described for indicating the condition of catalyst particles in a catalytic cracking unit which includes a tube having an unrestricted upper open end and arranged substantially vertically to receive catalyst particles from and to return them to said cracking unit, said tube being insulated and having a restriction orifice near its lower end, means whereby a controlled amount of reactant gas is introduced into the bottom portion of said tube and a definite amount of catalyst particles is drawn into said tube through said restriction orifice for upward flow therethrough and for discharge from the unrestricted upper open end of said tube, and temperature responsive means connected to the upper portion of said tube for indicating the temperature thereof for comparison with the temperature of the catalyst particles in the cracking unit.

12. An apparatus of the character described including a tube having an unrestricted open upper end and being of substantially uniform diameter throughout its length and adapted to be arranged substantially vertically in a catalyst regenerator for finely divided catalyst containing carbonaceous deposits and maintained as a fluid bed, said tube being provided with heat insulation and having a restriction orifice adjacent its bottom portion, means adjacent said orifice whereby a controlled amount of air is introduced into the bottom portion of said tube for upward passage therethrough and a certain definite amount of catalyst particles from said fluidized bed is introduced into the bottom portion of said tube through said restriction orifice and whereby the carbonaceous deposits on said catalyst particles so drawn into said tube for upward passage therethrough are burned and temperature responsive means connected with the upper portion and lower portion of said tube to indicate the amount of heat released by the burning of carbonaceous deposits from the catalyst particles as the air-catalyst mixture flows upwardly through said tube, the unrestricted upper open end of said tube being adapted to discharge the air-catalyst mixture into said regenerator for direct return of the catalyst particles to the catalyst in the fluid bed in said regenerator.

13. An apparatus of the character described for indicating the condition of catalyst particles in a catalytic cracking unit including a regenerator which includes a tube having an unrestricted upper open end and arranged substantially vertically in said regenerator to receive catalyst particles from a dense fluidized bed in said regenerator and to return them to said cracking unit, said tube being insulated and having a restriction orifice near its lower end, means whereby a controlled amount of reactant gas is introduced into the bottom portion of said tube and a definite amount of catalyst particles is drawn into the bottom portion of said tube through said restriction orifice for upward flow therethrough and for discharge from the unrestricted upper open end of said tube, and temperature responsive means connected to the upper portion of said tube and arranged to indicate the temperature difference between the catalyst-gas mixture in said tube and catalyst particles in said regenerator.

14. In an apparatus including a reactor and a regenerator and transfer lines connecting said reactor and regenerator for circulating finely divided cracking catalyst solids therebetween, the improvement which includes a separate substantially vertically arranged tube having an open unrestricted upper end and arranged entirely within said regenerator, means whereby a controlled amount of solid cracking catalyst particles containing fouling carbonaceous deposits is withdrawn from one portion of the finely divided cracking catalyst solids in said apparatus and is introduced into the lower portion of said tube for upward passage therethrough, means whereby a controlled amount of reactant gas is introduced into the lower portion of said tube for upward passage therethrough and for reacting with said fouling carbonaceous material on said finely divided cracking catalyst solids, said cracking catalyst solids-gas mixture being discharged from said unrestricted upper end of said tube and means for continuously indicating the temperature difference between the upper portion and the lower portion of said tube to give an indication of the quality of the circulating cracking catalyst solids.

References Cited in the file of this patent

UNITED STATES PATENTS

| 1,627,204 | Ruben | May 3, 1927 |
| 2,735,744 | Rex | Feb. 21, 1956 |
| 2,753,246 | Shields | July 3, 1956 |